United States Patent
Naghi et al.

(10) Patent No.: US 6,422,715 B2
(45) Date of Patent: *Jul. 23, 2002

(54) APPARATUS FOR ILLUMINATING A PORTABLE ELECTRONIC OR COMPUTING DEVICE

(75) Inventors: David Naghi; Herschel Naghi; Eric A. Hanscom, all of Los Angeles; Gilbert Fregoso, Santa Ana, all of CA (US)

(73) Assignee: Technology Creations, Inc., Los Angeles, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/847,118

(22) Filed: May 1, 2001

Related U.S. Application Data

(63) Continuation-in-part of application No. 09/712,692, filed on Nov. 13, 2000, now Pat. No. 6,318,873, which is a continuation of application No. 09/330,322, filed on Jun. 11, 1999, now Pat. No. 6,186,636.

(51) Int. Cl.[7] .................................................. F21V 33/00
(52) U.S. Cl. ......................... 362/85; 362/84; 362/253; 362/109; 362/198; 362/311
(58) Field of Search .......................... 362/84, 85, 253, 362/109, 319, 311, 198, 20, 234; 439/502, 504

(56) References Cited

U.S. PATENT DOCUMENTS

| | | |
|---|---|---|
| 1,651,307 A | 11/1927 | Wilkinson |
| 3,065,339 A | 11/1962 | Fahey, Jr. et al. ............. 240/25 |
| D238,959 S | 2/1976 | Kurokawa et al. ........ D48/20 F |
| D251,687 S | 4/1979 | Kurokawa ............... D48/20 F |
| 5,122,937 A | 6/1992 | Stoudemire .................. 362/109 |
| 5,122,941 A | 6/1992 | Gross et al. ................. 362/276 |
| 5,136,477 A | 8/1992 | Lemmey ..................... 362/198 |
| 5,183,325 A | 2/1993 | Hurdle ........................ 362/109 |
| 5,379,201 A | 1/1995 | Friedman .................... 362/191 |
| D377,840 S | 2/1997 | Chang .......................... D26/62 |
| 5,615,945 A | 4/1997 | Tseng .......................... 362/226 |
| 5,708,840 A | 1/1998 | Kikinis et al. ............... 395/281 |
| 5,746,501 A | 5/1998 | Chien .......................... 362/103 |
| 5,822,546 A | 10/1998 | George ......................... 395/281 |
| 5,980,060 A | 11/1999 | Chien .......................... 362/103 |
| D418,240 S | 12/1999 | Sherman ..................... D26/63 |
| 6,166,496 A | 12/2000 | Lys et al. .................... 315/316 |
| 6,273,581 B1 | 8/2001 | Neiser ......................... 362/109 |

OTHER PUBLICATIONS

Amazon.com product web page printout for "Adventure Book Light and Flashlight" by Lumatec; http://www.amazon.com/exec/obidos/ASIN/b00000IJZM/104-9549104-0986847; printed Mar. 2, 2000.

Book light product internet web page printout; http://store1.yimg.com/I/parksherman_1550_902141; printed Mar. 2, 2000.

(List continued on next page.)

Primary Examiner—Sandra O'Shea
Assistant Examiner—Ali Alavi
(74) Attorney, Agent, or Firm—Procopio, Cory, Hargreaves & Savitch, LLP

(57) ABSTRACT

An illumination apparatus for illuminating an object associated with a portable handheld video game device having a port in electrical connection with at least one power source. The illumination apparatus includes a plug for plugging the apparatus into the port, a body connected to the plug, an illumination device connected to the body and adapted to be powered by the power source when the plug is plugged into the port for illuminating an object associated with the portable handheld video game device, the illumination device including a connection member, and an interchangeable illumination head removably attached to the connection member of the illumination device and adapted to be illuminated by the illumination device.

12 Claims, 5 Drawing Sheets

OTHER PUBLICATIONS

"Designed Halogen Lamps With Multiple Features," *Taiwan Lighting*, Feb. 1997, p. 69.

FlyLight™ Notebook USB Light, Kensington Products; http://www.kensington.com/products/pro_cas_d1334.html, Printed Feb. 15, 2001.

Igo.com product web page printout for "NBL–100 Notebook Light" by Interex; http://www.igo.com/cgi–bin/ncommerce3/ProductDisplay?prmenbr=1&prrfnbr–522530; printed Jul. 21, 2000.

Sierra Gold Marketing "SGM28367" Clip On Light product web page printout; http://www.sgm.simplenet.com/boutique/special/sgm28367.htm; printed Mar. 2, 2000.

"The Ittybitty Book Light" internet web page printout; http://www.zelco.com/10013.jpg; printed Mar. 2, 2000.

"Ultimate Palmtop Computer Lights®" internet web page printout; http://www.std.com/sfl/3.pct.html; printed Mar. 2, 2000.

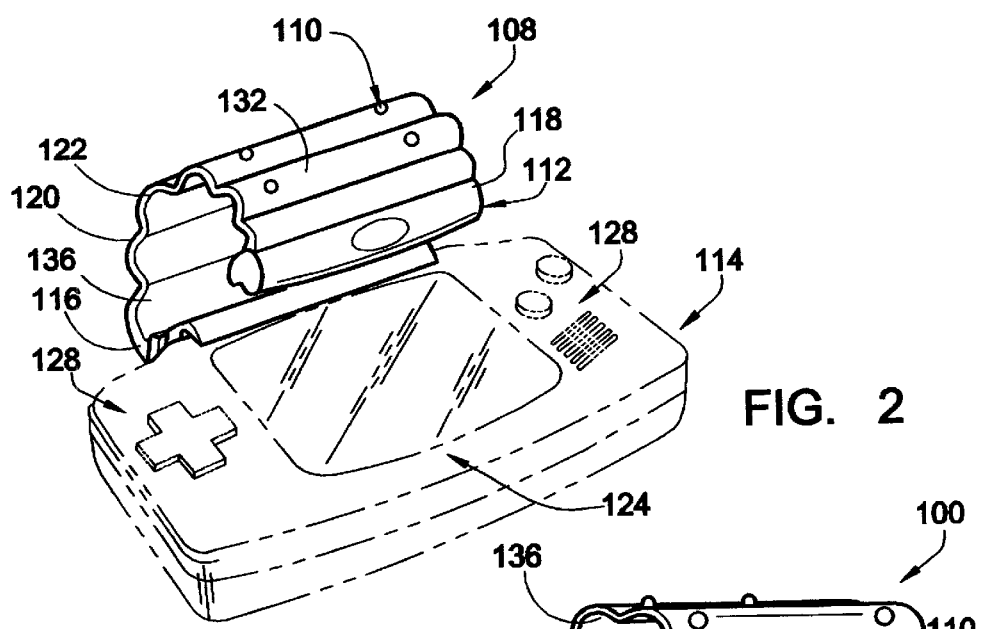
FIG. 2
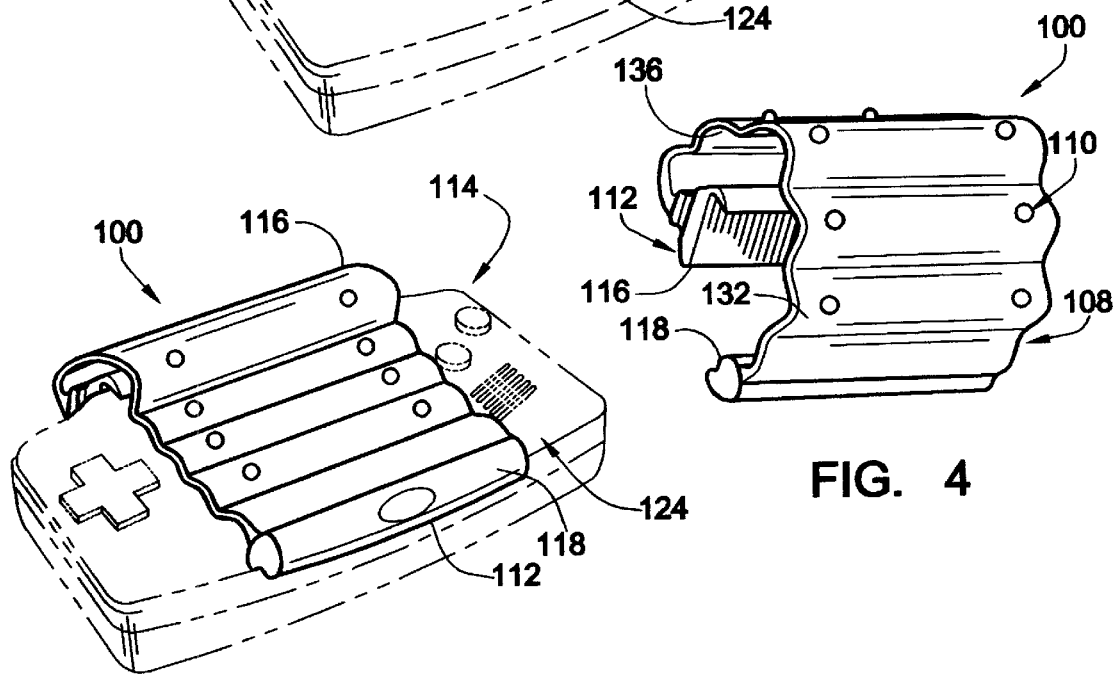
FIG. 4
FIG. 3
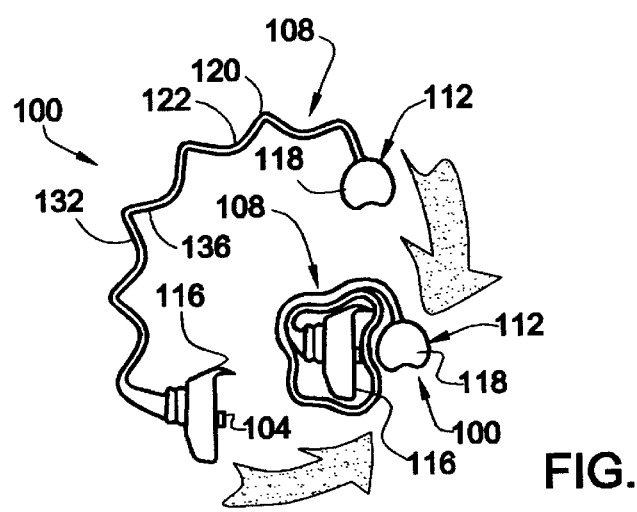
FIG. 5

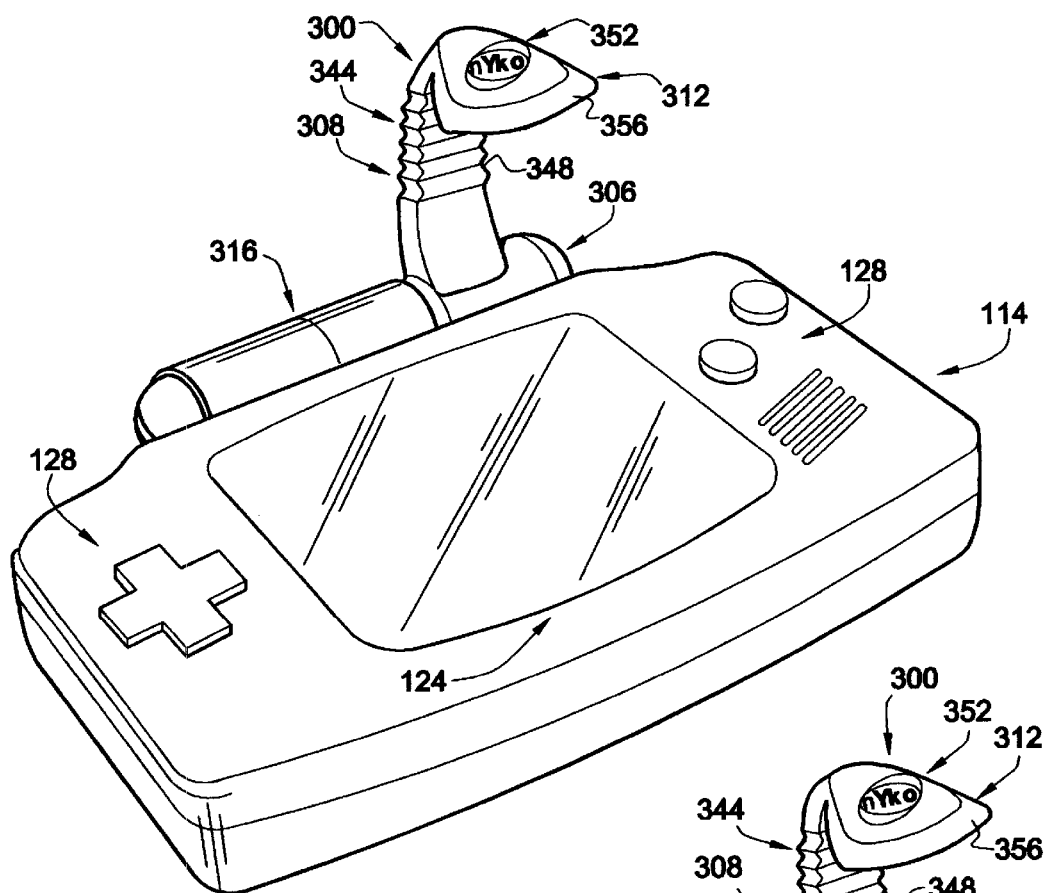
FIG. 9
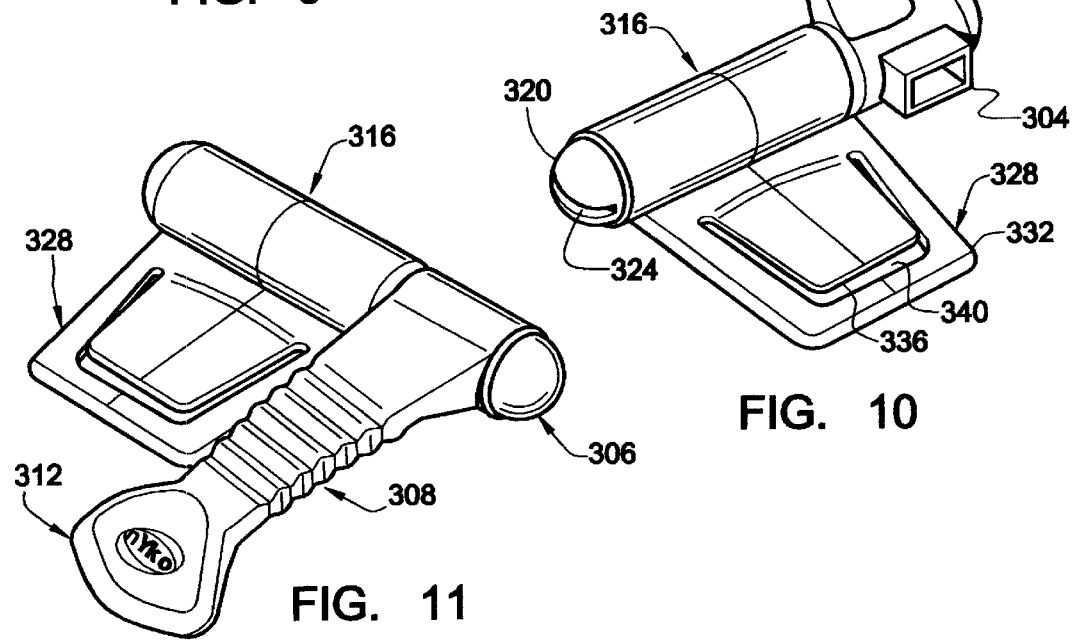
FIG. 10
FIG. 11

APPARATUS FOR ILLUMINATING A PORTABLE ELECTRONIC OR COMPUTING DEVICE

This is a Continuation-In-Part of prior application Ser. No. 09/712,692 filed on Nov. 13, 2000, now U.S. Pat. No. 6,318,873 which is a continuation of prior application Ser. No. 09/330,322 filed Jun. 11, 1999, which issued on Feb. 13, 2001 as U.S. Pat. No. 6,186,636.

FIELD OF THE INVENTION

The present invention is in the field of lighting devices for portable electronic or computing devices.

BACKGROUND OF THE INVENTION

Compact electronic devices with a viewing screen or keypads have become very common and quite popular. Such devices have been popular for a number of years in connection with hand-held, portable, battery-powered gaming devices. A well-known example of such a device, that has sold millions of units, is the GAME BOY™ device sold by Nintendo. More recently, other electronic devices have also included viewing screens, such as portable video cameras and cellular phones. And, of course, portable computers have long had viewing screens. Although the complexity and cost of such devices can vary greatly, it is common for such devices to use a generally flat, liquid crystal display screen.

Flat, liquid crystal display screens work very well in a well-lit area. However, when such devices are used in dimly lit areas, or at night, it can be difficult, if not impossible, for a user to see anything in the viewing screen. This problem is magnified when such a screen is used in a device that is meant to be portable, and especially when it is a small device.

If a portable device is sufficiently complex, and generally more expensive, such as a portable laptop computer, the device can include lighting within the actual device. An example of such lighting is a portable laptop computer with a backlit screen. However, this solution is not always economically practical, nor does it necessarily solve the problem in smaller devices. Also, if an electronic device does not have a viewing screen, then this option is not even available.

To solve this problem, especially in connection with hand-held, portable, battery-powered gaming devices, a number of different solutions have been proposed. Such solutions have typically included add-on devices with their own source of electrical power. These devices can be designed to fit onto the electronic device or be designed for use in connection with the electronic device. However, because such devices use their own source of electrical power, they tend to be rather bulky and heavy. In addition, the second source of electrical power increases cost and creates the possibility of another source of power failure.

Accordingly, there is a long felt need for a simple, economical, device that can illuminate portable electronic or computing devices and associated objects without the drawbacks associated with prior illumination devices.

SUMMARY OF THE INVENTION

An aspect of the invention involves an illumination apparatus for illuminating an object associated with a portable handheld video game device having a port in electrical connection with at least one power source. The illumination apparatus includes a plug for plugging the apparatus into the port, a body connected to the plug, an illumination device connected to the body and adapted to be powered by the power source when the plug is plugged into the port for illuminating an object associated with the portable handheld video game device, the illumination device including a connection member, and an interchangeable illumination head removably attached to the connection member of the illumination device and adapted to be illuminated by the illumination device.

Another aspect of the invention involves a method of illuminating an object associated with a portable handheld video game device having a port in electrical connection with at least one power source. The method includes providing an illumination apparatus comprising a plug for plugging the apparatus into the port, a body connected to the plug, and an illumination device connected to the body, the illumination device adapted to removably receive one of numerous different interchangeable illumination heads; plugging the plug of the illumination apparatus into the port of the portable handheld video game device; connecting one of numerous different interchangeable illumination heads to the illumination device; and lighting the illumination device and the interchangeable illumination head with the power source to illuminate an object associated with the portable handheld video game device.

An additional aspect of the invention involves a kit for illuminating an object associated with a portable handheld video game device having a port in electrical connection with at least one power source. The kit includes an illumination apparatus comprising a plug for plugging the apparatus into the port, a body connected to the plug, an illumination device connected to the body and adapted to be powered by the power source when the plug is plugged into the port for illuminating an object associated with the portable handheld video game device, the illumination device including a connection member; and multiple interchangeable illumination heads, each removably attachable to the connection member of the illumination device for illumination by the illumination device.

A further aspect of the invention involves a method of illuminating an object associated with a portable handheld video game device having a port in electrical connection with at least one power source and a display screen with a width and a height. The method includes providing a flexible illumination apparatus comprising a plug for plugging the apparatus into the port, a flexible body connected to the plug, the body having a width substantially the same as at least one of the width and the height of the display screen, and an illumination device connected to the body; plugging the plug of the illumination apparatus into the port of the portable handheld video game device; lighting the illumination device with the power source to illuminate an object associated with the portable handheld video game device; and covering the display screen with the body of the illumination apparatus when the portable handheld video game device is not in use.

A still further aspect of the invention involves a method of illuminating an object associated with a portable handheld video game device having a port in electrical connection with at least one power source and a display screen with a width and a height. The method includes providing a flexible illumination apparatus comprising a plug for plugging the apparatus into the port, a flexible body connected to the plug, the body having a width substantially the same as at least one of the width and the height of the display screen, and an illumination device connected to the body; plugging the plug of the illumination apparatus into the port of the portable handheld video game device; lighting the illumination device with the power source to illuminate an object associated with the portable handheld video game device; and rolling the illumination apparatus upon itself when the portable handheld video game device is not in use.

A yet further aspect of the invention involves an illumination apparatus for illuminating an object associated with a portable handheld video game device having a port in electrical connection with at least one power source and a display screen with a width and a height. The illumination apparatus includes a plug for plugging the apparatus into the port; a flexible body connected to the plug, the body having a width substantially the same as at least one of the width and the height of the display screen; and an illumination device connected to the body to illuminate an object associated with the portable handheld video game device, wherein the flexible body is adapted to be positioned between at least a first position where the illumination device is positioned to illuminate an object associated with the portable handheld video game device and a second position where the body covers the display screen when the portable handheld video game device is not in use.

An additional aspect of the invention involves an illumination apparatus for illuminating an object associated with a portable handheld video game device having a port in electrical connection with at least one power source and a display screen with a width and a height. The illumination apparatus includes a plug for plugging the apparatus into the port; a flexible body connected to the plug, the body having a width substantially the same as at least one of the width and the height of the display screen; and an illumination device connected to the body to illuminate an object associated with the portable handheld video game device, wherein the flexible body is adapted to be rolled upon itself when the portable handheld video game device is not in use.

Another aspect of the invention involves an illumination apparatus for illuminating an object associated with a portable handheld video game device having a port in electrical connection with at least one power source. The illumination apparatus includes a base; a plug extending from the base for plugging the apparatus into the port; a body connected to the plug; an illumination device connected to the body to illuminate an object associated with the portable handheld video game device; and at least one power source carried by the base for powering the illumination device when the portable handheld video game device is not capable of delivering power through the port.

These and further objects and advantages will be apparent to those skilled in the art in connection with the drawing and the detailed description of the preferred embodiment set forth below.

BRIEF DESCRIPTION OF THE DRAWINGS

FIG. 2 is a perspective view of another embodiment of an illumination apparatus connected with a handheld video game device.

FIG. 3 is a perspective view of the illumination apparatus illustrated in FIG. 2 applied to a handheld video game device with the illumination apparatus shown in a collapsed, flat condition as a display screen cover.

FIG. 4 is a rear perspective view of the illumination apparatus illustrated in FIG. 2, illustrating electroluminescent members exposed on a back side of the illumination apparatus.

FIG. 5 is a side elevational view of the illumination apparatus illustrated in FIG. 2, illustrating the illumination apparatus in an expanded and a collapsed, rolled-up condition.

FIG. 9 is a perspective view of a further embodiment of an illumination apparatus connected with a handheld video game device.

FIG. 10 is a perspective view of the illumination apparatus illustrated in FIG. 9 without the handheld video game device.

FIG. 11 is a perspective view of the illumination apparatus illustrated in FIG. 10 with a foldable body of the illumination apparatus shown in a folded-down or pivoted-down position.

DETAILED DESCRIPTION OF THE PREFERRED EMBODIMENT

Figure 1:
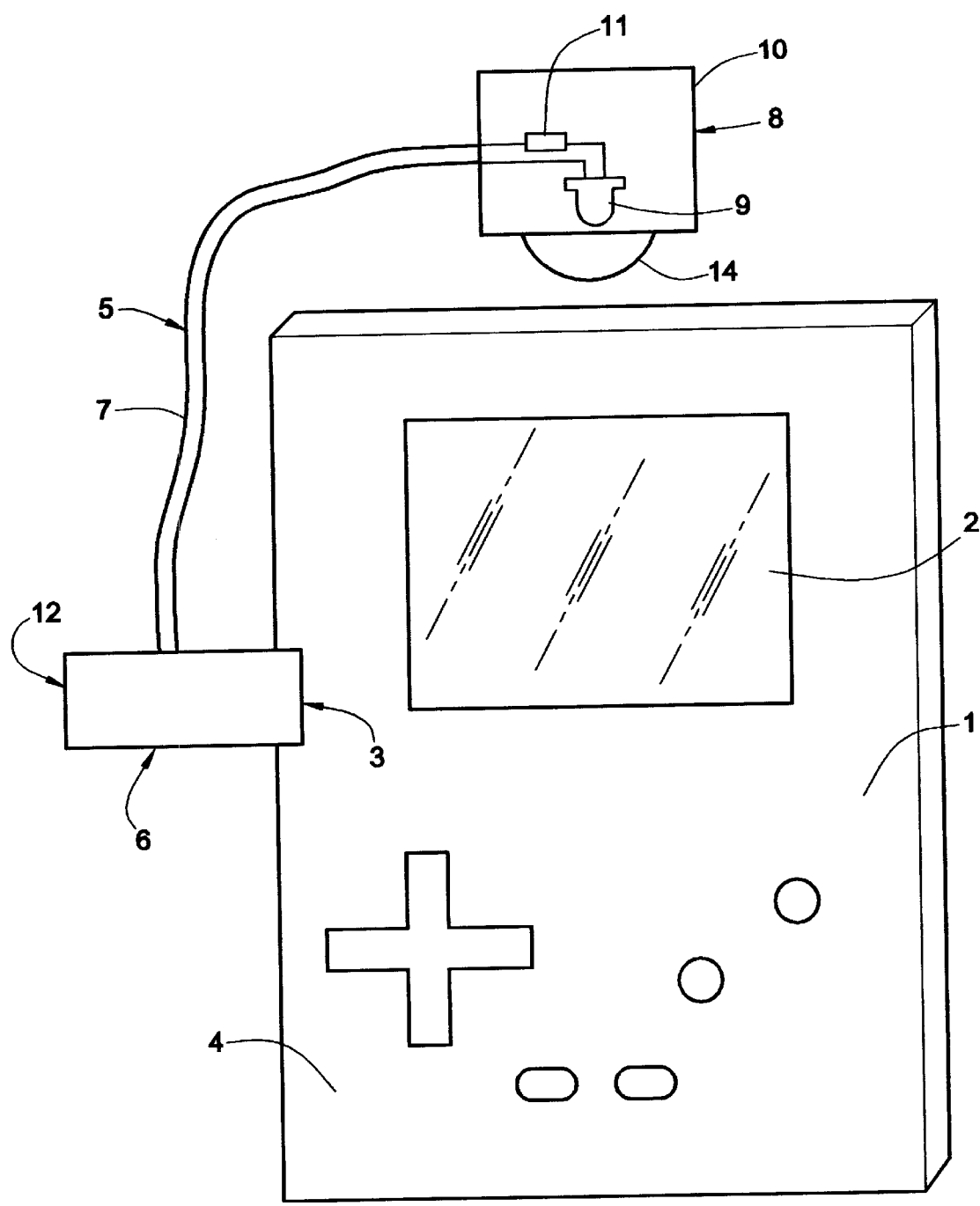
FIG. 1 is a schematic representation of an embodiment of the present invention.

FIG. 1 illustrates how a preferred embodiment of the present invention can be used with a portable electronic game device, such as a GAME BOY™ device. Although this drawing depicts a portable electronic game device, the invention is adaptable to any portable electronic device that has a utility power jack in electrical connection with a power source, such as a cellular phone or a video camera.

In the preferred embodiment shown in FIG. 1, the electronic device 1 has a viewing screen 2, a power source and a utility power jack. The power source and utility power jacks are not visible and are shown generally as 3 and 4, because their location and configuration will vary depending upon the design of a given portable electronic device. The power source 3 may be self-contained, such as batteries in a battery compartment. The power source 3 may or may not be augmented by a plug-in capability to a non-portable power source, such as a wall outlet.

The illumination apparatus, shown generally as 5, includes a plug, shown generally as 6, for plugging the illumination apparatus 5 into the utility power jack 4 of the electronic device 1. The exact configuration of the plug 6 should be designed so as to mate with the utility power jack 4 and create a mechanical and electrical connection between the utility power jack 4 and the plug 6 when the apparatus 5 is plugged into the electronic device 1.

The illumination apparatus 5 also includes a body 7 and an illumination device 8. The body 7 connects the illumination device 8 to the plug 6, and the body is preferably comprised of a flexible arm. The illumination device 8 is electrically connected to the utility power jack 4 through the plug 6 and the body 7 so that the illumination device 8 is powered by the power source 2 when the illumination apparatus 5 is plugged into the electronic device 1. The electrical connection between the illumination device 8 and the plug 6 can be by any suitable means, such as by a wire (not shown). It is especially preferred that the body 7 can be adjusted, when the apparatus 5 is plugged into the utility power jack 4, to adjust the height and/or the angle of the illumination device 8 relative to the electronic device 1.

In the preferred embodiment of the present invention, the illumination device 8 is comprised of a light emitting diode ("LED") 9 housed in a case housing 10. The housing 10 can also include suitable electronics, such as a resistor 11, or a regulator (not shown) for varying the intensity of light given off by the LED. In an especially preferred embodiment, the LED 9 is a white light diode. The housing can also include additional features, such as a diffuser lens 9, or a magnifier (not shown).

When the plug 6 of the illumination apparatus 5 is plugged into the utility power jack 4 of the electronic device 1, it necessarily occupies the connection that the utility power jack 4 would otherwise provide to a user of the electronic device 1. Because a user of the electronic device 1 might need to connect some other device to the utility power jack 4, it is especially preferred that the plug 6 be constructed so as to include a second utility power jack 12. The second utility power jack 12 is adapted to receive a second plug and provide a mechanical and electrical connection for the second plug equivalent to that which is provided by the utility power jack 4. Thus, the second utility power jack 12 will provide electrical communication for the second plug with the utility power jack 4 when the second plug is plugged into the plug 6 and the plug 6 is plugged into the utility power jack 4.

The present invention is also adaptable to a portable computing device with a display screen that is not illuminated by the portable computing device. In such an embodiment, the illumination apparatus is plugged into a utility port of the computing device in electrical connection with a power source instead of the utility power jack 4 of the electronic device 1. In such a device, the utility port can be any port that allows connection of additional products or communication devices, or cables, or any additional accessory or product. The illumination apparatus can have a second utility port adapted to receive a second plug that is in electrical communication with the utility port when the second plug is plugged into the plug and the plug is plugged into the utility port. In all other respects, the structure and function of the illumination apparatus would be the same as for the illumination apparatus 5 described above in connection with electronic device 1.

With reference to FIGS. 2–5, an illumination apparatus 100 constructed in accordance with another embodiment of the invention will now be described. The apparatus 100 includes a plug 104 (FIG. 5), a ribbon-shaped body 108 that may carry one or more electro-luminescent ("EL") members 110, and an illumination device 112 at an opposite end of the body 108 from the plug 104. The plug 104 plugs into a jack or port (not shown) of an electronic or computing device 114. The plug 104 extends from a laterally elongated base 116. The illumination device 112 includes a generally cigar-shaped light housing 118 that houses one or more light sources, e.g., white LED(s). The body 108 has a wide, ribbon-like shape. With reference to FIG. 5, from a side-elevational view, the body 108 has a wave-like shape with crests 120 and troughs 122. The body 108 preferably has a width that is substantially the same as the width and/or height of the display screen 124 and is made of a flexible, bendable material capable of being bent or shaped into multiple configurations such as, but not by way of limitation, those shown in FIGS. 2–5. For example, with reference to FIG. 2, the body 108 may be bent to a desired configuration for optimal illumination of a display screen 124 or other object associated with the electronic or computing device 120, e.g., input area(s) 128, associated video game user guide, reading publication, notes, etc. With reference to FIG. 3, the body 108 may be bent to a flat condition to serve as a display screen cover when the illumination apparatus 100 is not in use. FIG. 5 illustrates how the illumination apparatus 100 may be collapsed into a compact position for storage. This is accomplished by wrapping the body 108 around the base 116 and itself.

The one or more EL members 110 preferably run longitudinally with respect to the body 108 and are in electrical communication with the plug 104 so that the EL member(s) 110 are illuminated when the plug 104 is in electrical communication with at least one power source of the electronic or computing device 114 via the port. In the embodiment shown, the EL member(s) 110 are exposed along a back side 132 of the body 108 as circular members. In alternative embodiments, the EL member(s) 110 may reside in or along one or more of the following: a front side 136, the back side 132, both the front side 136 and the back side 132, the base 116, and the illumination device 112. The EL member(s) 110 are preferably EL wires or tubes. Each EL wire is a light emitting capacitor. The capacitive structure is formed by a light emitting electroluminescent semi-conductor layer sandwiched between two conductive electrodes. A copper wire serves as a core electrode The copper wire is coated with several layers of dielectric and semi-conductor materials which together form a coaxial construction. A transparent conductive layer is then added with two thin copper wires which serve as the second electrode and when AC voltage is applied between the two electrodes and exceeds a well-defined threshold value, the semi-conductor material between the two electrodes emits light. The EL member(s) 110 are preferably LyTec™ Electroluminescent wires sold by ELAM Electroluminescent Industries Ltd. of Jerusalem, Israel. The EL member(s) 110 are preferably thin, flexible, durable, nontoxic, safe, UV resistant, use a minimal amount of electricity, and come in a wide variety of colors such as, but not by way of limitation, yellow, orange, green, coral, blue, aqua, purple, lime, red. One or more of the EL member(s) 110 may have one or more of these colors.

The base 116 may house a controller comprising hardware, e.g., electrical circuit, and/or software for causing the EL member(s) 110 to flash, blink, flicker, or light intermittently, flash, blink, flicker, or light simultaneously, flash, blink, flicker, or light in a random pattern or order, flash, blink, flicker, or light in a predetermined pattern or order, brighten and/or dim the lighting of the member(s) 110, flash, blink, flicker, or light based on activity occurring with the electronic or computing device 114. For example, if the electronic or computing device 114 is a handheld video game device such as a GAME BOY™, signals from the video game being played and/or from the device 114 may be used by the controller to control lighting of the EL member(s) 110, e.g., a green EL member 110 flashes, blinks, flickers, or lights when something good happens in the game and a red EL member 110 flashes, blinks, flickers, or lights when something bad happens in the game. The controller may include a sequencer with speed control, on/off control, reverse direction control. The controller or other electronics associated with the EL member(s) 110 preferably includes an inverter to convert DC power from the power source of the device 114 to AC power for lighting the EL member(s) 110. The base 116 may include an on/off switch to switch the illumination apparatus 100 on or off.

In an alternative embodiment, the illumination apparatus 100 may alternatively or additionally include its own power source, i.e., may include a plug 104 and/or its own power source for delivering electricity to the illumination device and/or the illumination member(s) 110.

In use, the plug 104 of the illumination apparatus 100 is plugged into the port of the device 114 so that when the device 114 is powered on, the illumination apparatus 100 is also powered on, causing the light source(s) of the illumination device 112 to illuminate and/or the EL member(s) 110 to illuminate. The body 108 may be bent to a desired configuration for optimal lighting of any object(s) associated with the device 114 such as, but not by way of limitation, the display screen 124. When not in use, the body 108 may be collapsed to the flat condition shown in FIG. 3 so that the body 108 serves as a display screen cover to protect the screen, and to give the apparatus 100 and device 114 a sleeker, lower profile for easier and more convenient storage and transport. Alternatively, the illumination apparatus 100 may be unplugged from the device 114, and the body 108 may be collapsed or rolled upon itself as shown in FIG. 5 for storage of the apparatus 100. In another embodiment, the illumination apparatus 100 may be powered without having to activate the device 114. In this embodiment, an on/off switch associated with the apparatus 100 may be used for controlling illumination of the apparatus 100.

Figure 6:
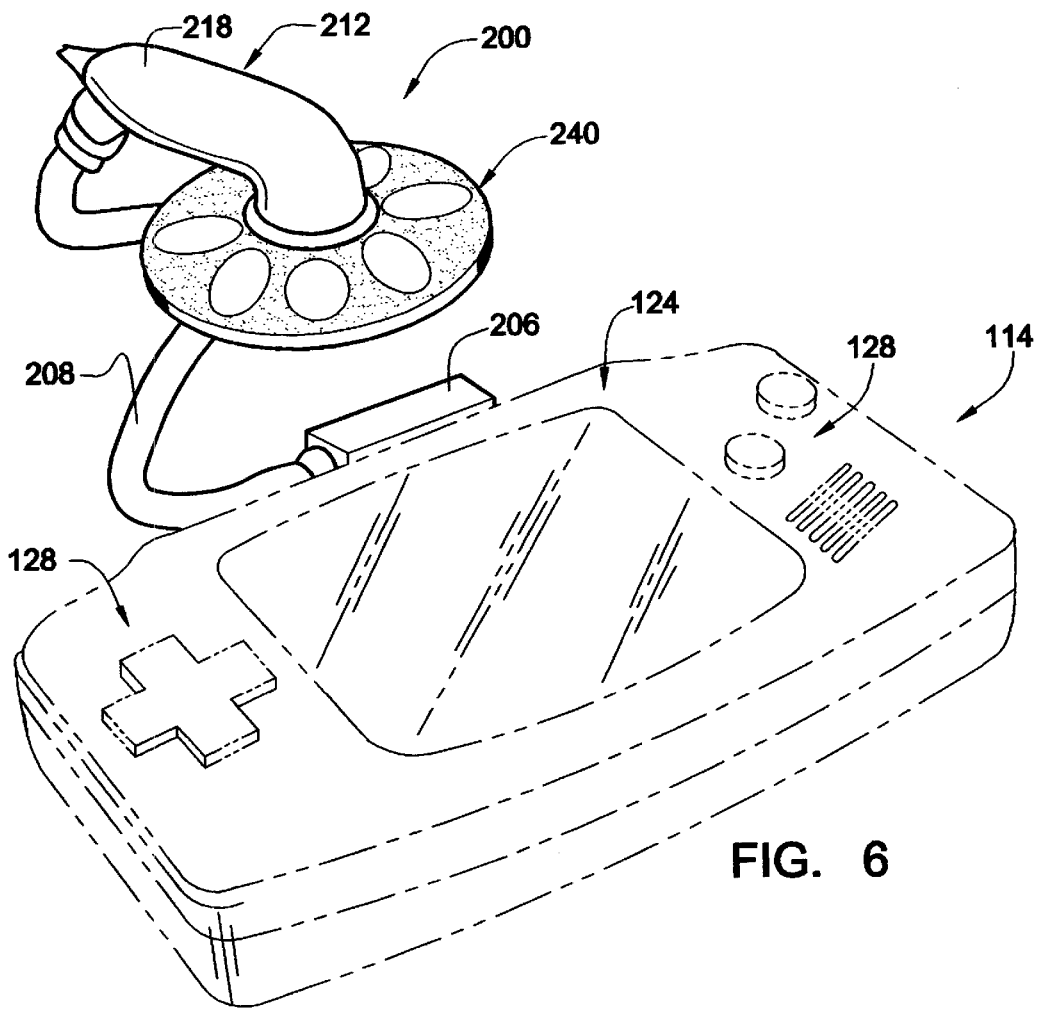
FIG. 6 is a perspective view of an additional embodiment of an illumination apparatus connected with a handheld video game device.
Figure 8:
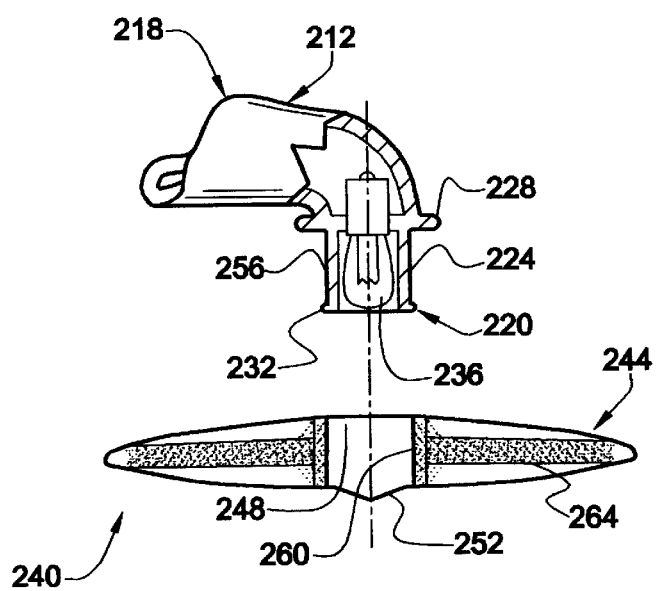
FIG. 8 is a side-elevational view of the illumination device with a portion of the illumination device and an interchangeable head of the illumination apparatus shown in cross-section.
Figure 7:
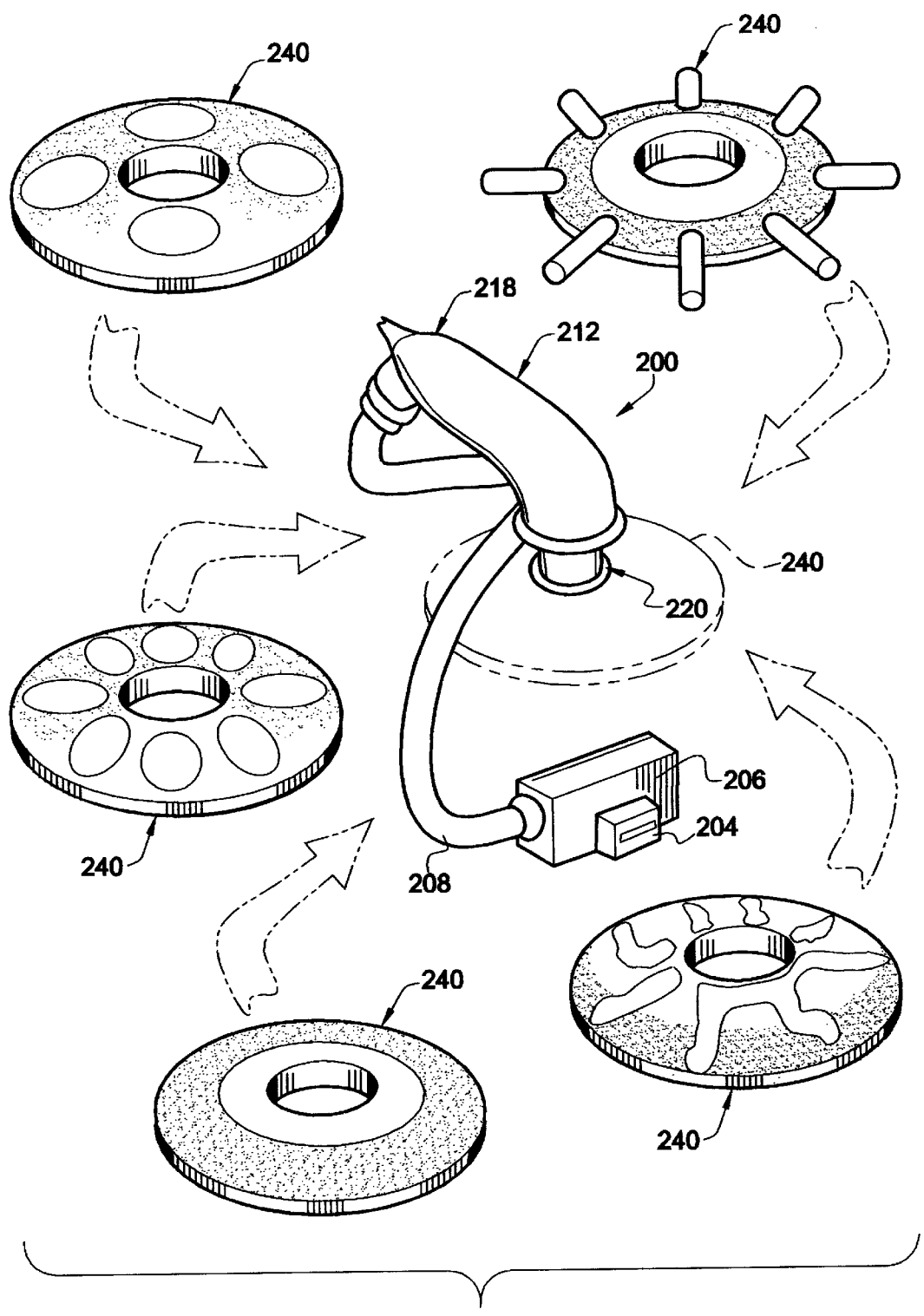
FIG. 7 is a perspective view of the illumination apparatus illustrated in FIG. 6, illustrating multiple interchangeable heads that may be connected to the illumination device.

With reference to FIGS. 6–8, an illumination apparatus 200 constructed in accordance with an additional embodiment of the invention will be described. The apparatus 200 includes a plug 204 (FIG. 7) extending from a base 206, a curvilinear bendable body 208, and an illumination device 212 at an opposite end of the body 208 from the plug 204. The plug 204 plugs into the jack or port (not shown) of the electronic or computing device 114. The illumination device 212 includes a beatle-shaped housing 218. The housing 218 includes a downwardly extending, clear plastic, cylindrical connection member 220. The connection member 220 includes a cylindrical body 224, an upper circular flange 228, and a lower circular flange 232. The lower circular flange 232 has a diameter slightly greater than the diameter of the cylindrical body 224. One or more light sources 236, e.g., white LED(s), are housed within the connection member 220.

A variety of differently configured interchangeable plastic heads 240 may be connected to the connection member 220. Each head 240 may have a generally disc-like plastic body 244 with a central connection hole 248. The hole 248 is open on a top end for snappingly receiving the connection member 220 and closed on a bottom end with a transparent or translucent lens 252. Although the heads 240 are described as being disk-shaped, the heads 240 may come in a variety of different configurations other than disk-shaped. Further, the heads 240 may come in different themes, colors, light patterns, etc.

In use, one of the unique, interchangeable, disk-shaped heads 240 is snapped onto the connection member 220. The plug 204 of the illumination apparatus 200 is plugged into the port of the device 114. When the device 114 is powered on, the light source(s) 236 is also powered on. The light source(s) 236 illuminates the disk-shaped head 240 and any object(s) associated with the device 114 such as, but not by way of limitation, the display screen 124 and/or the input area(s) 128. The body 208 may be bent to a desired configuration for optimal lighting of the object(s) associated with the device 114. In another embodiment, the illumination apparatus 200 may be powered without having to activate the device 114. In this embodiment, an on/off switch associated with the apparatus 200 may be used for controlling illumination of the apparatus 200.

With reference to FIG. 8, in an alternative embodiment of the illumination apparatus 100, the cylindrical body 224 of the connection member 220 may have an electrically conductive outer surface 256 that is electrically coupled to the plug 204. One or more of the heads 240 may have an electrically conductive cylindrical inner surface 260 that comes in electrical contact with the conductive outer surface 256 of the connection member 220 when the head 240 is connected to the connection member 220. A disk-shaped EL member 264 is coupled to the conductive inner surface 260 of the head 240. When the head 240 is connected to the connection member 220 and the illumination apparatus 200 is plugged into the port of the device 114, the disk-shaped EL member 264 illuminates the head 240. Although the EL member 240 is described as being disk-shaped, the EL member 240 may be wire-shaped, or have other configurations. As described above with respect to the EL members 110, the EL member 240 may come in a variety of different colors. The EL member 240 may also be actuated and controlled in a manner similar to that described above the EL members 110.

Another embodiment of the invention involves a kit including the illumination apparatus 200 and the multiple interchangeable heads 240.

With reference to FIGS. 9–11, an illumination apparatus 300 constructed in accordance with a further embodiment of the invention will be described. The apparatus 300 includes a plug 304 extending from a base 306, a bendable body 308, and an illumination device 312 at an opposite end of the body 308 from the plug 304. The plug 304 plugs into the jack or port (not shown) of the electronic or computing device 114. The base 306 is generally cigar-shaped and includes a power source housing 316 that carries one or more power sources, e.g., disposable batteries, rechargeable batteries, fuel cells. In the embodiment shown, the power source housing 316 is sized to house a single AAA battery. A cover 320 is threadingly engageable with the power source housing 316. The cover 320 may include a slot 324 sized to receive an edge of a coin. The coin may be used as a tool to remove or attach the cover 320 for changing the battery. The power housing 316 preferably includes an on/off switch for activating or deactivating the illumination apparatus 100. A rhomboidal book clip mechanism 328 may extend forwardly from the base 306. The book clip mechanism 328 includes an outer book clip member 332 separated by an inner book clip member 336 by a space 340. The book clip mechanism 328 may also serve as a desk-top base for supporting the illumination apparatus 300.

The body 308 is adjustable for orienting the illumination device 312 in an optimal lighting condition. The body 308 is pivotally or foldably connected to the base 306 for pivotal or folding movement between a folded-up or pivoted-up position shown in FIG. 10 and a folded-down or pivoted-down position shown in FIG. 11. The body 308 is also bendable and shapeable. The body 308 includes a rhomboidal cross-section that gradually tapers in geometry from a point adjacent to the base 306 to a point adjacent to the illumination device 312. An upper portion 344 of the body 308 may have multiple ridges 348.

The illumination device 312 includes a light housing 352 with a transparent or translucent hood 356. One or more light sources, e.g., white LED(s), are housed within the light housing 352.

In use, the plug 304 of the illumination apparatus 300 is plugged into the port of the device 114. When the device 114 is powered on, the illumination apparatus 300 is also powered on. This causes the light source(s) of the illumination device 312 to emit light through the hood 356. The body 108 may be adjusted to a desired configuration for optimal lighting of any object(s) associated with the device 114 such as, but not by way of limitation, the display screen 124 and/or input area(s) 128. start here This may be accomplished by folding or pivoting the body 308 relative to the base 306 to a desired position and/or bending the body 308 to a desired orientation. When not in use, the body 308 may be folded or pivoted to the folded-down position shown in FIG. 11 to give the apparatus 300 and the device 114 a sleeker, lower profile for easier and more convenient storage and transport.

Because the illumination apparatus 300 has its own power source, the illumination apparatus 300 may also be used with electronic or computing devices 114 (or other objects, e.g., books) that do not include a port that the apparatus 300 can plug into and draw power from. The clipping mechanism 328 may be used to clip the apparatus 300 to the device 114 or object, to clip the apparatus 300 to a support surface in the vicinity of the device 114 or object, or may serve as a desk top base if placed on a flat surface such as a table top. The illumination device 312 is actuated, causing light to be emitted through the hood 356, by moving the switch to the "on" position.

It will be readily apparent to those skilled in the art that still further changes and modifications in the actual concepts described herein can readily be made without departing from the spirit and scope of the invention as defined by the following claims.

What is claimed is:

1. A method of illuminating an object associated with a portable handheld video game device having a port in electrical connection with at least one power source and a display screen with a width and a height, comprising:
    providing an illumination apparatus comprising a plug for plugging the apparatus into the port, a body connected to the plug, the body having one or more EL members and a width at least the width of the display screen, and an illumination device carried by the body;
    plugging the plug of the illumination apparatus into the port of the portable handheld video game device;
    lighting the illumination device with the power source to illuminate an object associated with the portable handheld video game device; and
    covering the display screen with the body of the illumination apparatus when the portable handheld video game device is not in use.

2. The method of claim 1, further including rolling the illumination apparatus upon itself when the portable handheld video game device is not in use.

3. The method of claim 1, wherein the body is generally ribbon-shaped and has a wave-like cross-section.

4. The method of claim 1, wherein the illumination device includes at least one light emitting diode ("LED").

5. The method of claim 4, wherein at least one LED is at least one white LED.

6. A method of illuminating an object associated with a portable handheld video game device having a port in electrical connection with at least one power source and a display screen with a width and a height, comprising:
    providing a flexible illumination apparatus comprising a plug for plugging the apparatus into the port, a flexible body connected to the plug, the body having one or more EL members and a width substantially the same as at least one of the width and the height of the display screen, and an illumination device connected to the body;
    plugging the plug of the illumination apparatus into the port of the portable handheld video game device;
    lighting the illumination device with the power source to illuminate an object associated with the portable handheld video game device; and
    rolling the illumination apparatus upon itself when the portable handheld video game device is not in use.

7. An illumination apparatus for illumination an object associated with a portable handheld video game device having a port in electrical connection with at least one power source and a display screen with a width and a height, comprising:
    a plug for plugging the apparatus into the port;
    a body connected to the plug, the body having one or more EL members and a width at least the width of the display screen;
    an illumination device carried by the body to illuminate an object associated with the portable handheld video game device,
    wherein the body is adapted to be positioned between at least a first position where the illumination device is positioned to illuminate an object associated with the portable handheld video game device and a second position where the body covers the display screen when the portable handheld video game device is not in use.

8. The apparatus of claim 7, wherein the object associated with the portable handheld video game device is the screen of the portable handheld video game device.

9. The apparatus of claim 7, wherein the illumination apparatus also includes its own power source.

10. The apparatus of claim 7, wherein the illumination device includes at least one light emitting diode ("LED").

11. The apparatus of claim 10, wherein at least one LED is at least one white LED.

12. An illumination apparatus for illuminating an object associated with a portable handheld video game device having a port in electrical connection with at least one power source and a display screen with a width and a height, comprising:
    a plug for plugging the apparatus into the port;
    a flexible body connected to the plug, the body having one or more EL members and a width substantially the same as at least one of the width and the height of the display screen;
    an illumination device connected to the body to illuminate an object associated with the portable handheld video game device,
    wherein the flexible body is adapted to be rolled upon itself when the portable handheld video game device is not in use.

* * * * *